(12) United States Patent
Lee et al.

(10) Patent No.: US 10,552,022 B2
(45) Date of Patent: Feb. 4, 2020

(54) DISPLAY CONTROL METHOD, APPARATUS, AND NON-TRANSITORY COMPUTER-READABLE RECORDING MEDIUM

(71) Applicant: NAVER Corporation, Seongnam-si, Gyeonggi-do (KR)

(72) Inventors: Hyo Gun Lee, Seongnam-si (KR); Jong Ju Lee, Seongnam-si (KR); Won Kyoung Lee, Seongnam-si (KR); Hee Min Lee, Seongnam-si (KR); Jong Hyun Lee, Seongnam-si (KR); Dong Kil Shin, Seongnam-si (KR); Hyo Seok Kim, Seongnam-si (KR); Hyun Ho Jin, Seongnam-si (KR); Su Jean Kim, Seongnam-si (KR); Su Ah Min, Seongnam-si (KR); Sung Hee Lee, Seongnam-si (KR)

(73) Assignee: Naver Corporation, Seongnam-si (KR)

( * ) Notice: Subject to any disclaimer, the term of this patent is extended or adjusted under 35 U.S.C. 154(b) by 248 days.

(21) Appl. No.: 15/290,028

(22) Filed: Oct. 11, 2016

(65) Prior Publication Data

US 2018/0032242 A1 Feb. 1, 2018

(30) Foreign Application Priority Data

Jul. 28, 2016 (KR) ........................ 10-2016-0096373

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 3/0362* (2013.01); *G06F 3/0488* (2013.01); *G06F 3/04845* (2013.01)

(58) Field of Classification Search
CPC .............. G06F 3/04847; G06F 3/0362; G06F 3/04845; G06F 3/0488
See application file for complete search history.

(56) References Cited

U.S. PATENT DOCUMENTS

| | | | |
|---|---|---|---|
| 6,115,037 | A | 9/2000 | Sumiyoshi et al. |
| 9,318,110 | B2 * | 4/2016 | Roe .......................... G10L 15/22 |

(Continued)

FOREIGN PATENT DOCUMENTS

| | | | |
|---|---|---|---|
| JP | 2005269659 A | 9/2005 | |
| JP | 2016099948 A | 5/2016 | |

(Continued)

OTHER PUBLICATIONS

Korean Office Action dated Apr. 11, 2017 for corresponding Korean Patent Application No. 10-2016-0096373.

(Continued)

*Primary Examiner* — Di Xiao
(74) *Attorney, Agent, or Firm* — Harness, Dickey & Pierce, P.L.C.

(57) ABSTRACT

Provided is a display control method including: obtaining a first input of a user regarding a first region displayed on a display unit; activating an input reference object in the first region based on the first input; displaying an interface for manipulating the input reference object in a second region on the display unit based on the first input; obtaining a second input of the user regarding the interface; and changing a location of the input reference object in the first region based on the second input.

12 Claims, 6 Drawing Sheets

(51) Int. Cl.
  *G06F 3/0362*  (2013.01)
  *G06F 3/0488*  (2013.01)

(56) References Cited

U.S. PATENT DOCUMENTS

2011/0246943 A1\* 10/2011 Fujibayashi .......... G06F 3/0488
                                                         715/833
2017/0255293 A1\* 9/2017 Sundara-Rajan ..... G06F 3/0414

FOREIGN PATENT DOCUMENTS

| KR | 10-20060108802 A | 10/2006 |
| KR | 10-20150094243 A | 8/2015 |

OTHER PUBLICATIONS

Japanese Office Action dated Jul. 18, 2017 for corresponding Japanese Patent Application No. 2016-201622.

\* cited by examiner

FIG. 6

DISPLAY CONTROL METHOD, APPARATUS, AND NON-TRANSITORY COMPUTER-READABLE RECORDING MEDIUM

CROSS-REFERENCE TO RELATED APPLICATION

This application claims the benefit of priority under 35 U.S.C. § 119 to Korean Patent Application No. 10-2016-0096373, filed on Jul. 28, 2016, in the Korean Intellectual Property Office (KIPO), the entire contents of which are incorporated herein by reference.

BACKGROUND

1. Field

One or more example embodiments relate to a display control method, and/or apparatus; and a computer program recorded on a non-transitory computer-readable recording medium to perform the display control method.

2. Description of the Related Art

With the rapid development of information communication technology, various types of terminals, such as mobile communication terminals and personal computers (PCs), are implemented to perform various functions.

For example, mobile communication terminals have been recently implemented to perform various functions, such as a data communication function, an image or video capturing function using a camera, a music or video file reproducing function, a game function, and a broadcasting function, in addition to a basic voice communication function.

Recently, there has been a markedly increasing usage of messenger-type programs via which users chat by transmitting and receiving messages after accessing a communication network by using mobile communication terminals. However, due to the limitation of the physical size of the mobile communication terminals due to portability considerations, the physical size and display resolutions of display units (e.g., display panels, display devices, etc.) and input units (e.g., input/output (I/O) devices) of the mobile communication terminals are restricted, and thus, the users may make spelling errors while inputting messages into the messenger-type program using the mobile communication terminal.

To correct a misspelling, the user has to select the misspelling, but during the selection operation, the misspelled word may be hidden by a finger of the user. Consequently, the user may be unable to check whether the misspelled words are correctly selected.

SUMMARY

One or more example embodiments include a display control method, and/or apparatus, as well as a computer program recorded on a non-transitory computer readable medium, which improve the movement accuracy of an input reference object.

One or more example embodiments include a display control method, and/or apparatus, as well as a computer program recorded on a non-transitory computer readable medium, which provide an interface for manipulating an input reference object.

One or more example embodiments include a display control method, and/or apparatus, as well as a computer program recorded on a non-transitory computer readable medium, which enable a user to move an input reference object easily and intuitively.

Additional aspects will be set forth in part in the description which follows and, in part, will be apparent from the description, or may be learned by practice of at least one of the presented example embodiments.

According to one or more example embodiments, a display control method includes obtaining, using at least one processor, a first user input associated with a first region displayed on a display device, activating, using the at least one processor, an input reference object in the first region based on the first user input, displaying, using the at least one processor, an interface for manipulating the input reference object in a second region displayed on the display device based on the first user input, obtaining, using the at least one processor, a second user input regarding the interface, and changing, using the at least one processor, a location of the input reference object in the first region based on the second user input.

The displaying of the interface may include setting a point in the second region as a reference point, and the reference point may correspond to a current location of the input reference object in the first region.

The changing of the location of the input reference object may include changing the location of the input reference object in the first region to a to-be-changed location of the input reference object, and the reference point and an input point corresponding to the second input correspond to a relative location relationship between the current location of the input reference object and the to-be-changed location of the input reference object.

The location of the input reference object in the first region may change along one axis. The interface may include a slider extending along an axis corresponding to the one axis of the first region and configured to change the location of the input reference object based on a received user input, and a knob displayed on the slider and corresponding to the reference point or an input point corresponding to the second user input.

The second user input may include one or more continuous user inputs, and at least one of the one or more continuous inputs may be a user input related to the knob.

The display control method may further include updating the reference point to a point corresponding to the current location of the input reference object in the first region based on the second user input.

The location of the input reference object in the first region may be changed with regards to a 2-dimensional (2D) space, and the interface may include a 2D plane associated with the 2D space configured to receive at least one user input related to changing the location of the input reference object, and a knob displayed on the 2D plane and corresponding to the reference point or an input point corresponding to the second user input.

The display control method may further include displaying, using the at least one processor, the input reference object based on the changed location in the first region.

The first region may be a text box where text is input, and the first user input may be at least one of a tap input, a click input, and a touch input associated with at least a part of the text box.

According to one or more example embodiments, a display control apparatus includes a memory having computer readable instructions stored thereon, and at least one processor configured to execute the computer readable instructions to generate a screen comprising one or more regions for display on a display device, obtain at least a first user input and a second user input related to one or more objects displayed on the display device, activate an input reference object in the first region, display, in a second region displayed on the display device, an interface for manipulating the input reference object, and change a location of the input reference object in the first region based on the second user input.

The at least one processor may be further configured to may set at least one point in the second region as a reference point, and the reference point may correspond to a current location of the input reference object in the first region.

The at least one processor may be further configured to change the location of the input reference object in the first region to a to-be-changed location of the input reference object, the reference point and an input point corresponding to the second user input may correspond to a relative location relationship between the current location of the input reference object and the to-be-changed location of the input reference object.

The at least one processor may be further configured to change the location of the input reference object in the first region along one axis, and the interface may include a slider extending along an axis corresponding to the one axis of the first region and configured to change the location of the input reference object, and a knob displayed on the slider and corresponding to the reference point or an input point corresponding to the second user input.

The at least one processor may be further configured to obtain the second user input comprising one or more continuous inputs, and at least one of the one or more continuous inputs may be a user input associated with the knob.

When the obtained second user input has ended, the at least one processor may be further configured to update the reference point to a point corresponding to the current location of the input reference object in the first region.

The at least one processor may be further configured to change the location of the input reference object in the first region on a 2-dimensional (2D) space, and the interface may include a 2D plane associated with the 2D space and configured to receive at least one user input to change the location of the input reference object, and a knob displayed on the 2D plane and corresponding to the reference point or an input point corresponding to the second user input.

The at least one processor may be further configured to display the input reference object according to the changed location in the first region.

According to one or more example embodiments, a non-transitory computer-readable recording medium having computer readable instructions stored thereon, which when executed by at least one processor, causes the at least one processor to execute, a display control method including obtaining, using at least one processor, a first user input associated with a first region displayed on a display device, activating, using the at least one processor, an input reference object in the first region based on the first user input, displaying, using the at least one processor, an interface for manipulating the input reference object in a second region displayed on the display device based on the first user input, obtaining, using the at least one processor, a second user input regarding the interface, and changing, using the at least one processor, a location of the input reference object in the first region based on the second user input.

BRIEF DESCRIPTION OF THE DRAWINGS

Example embodiments will be described in more detail with regard to the figures, wherein like reference numerals refer to like parts throughout the various figures unless otherwise specified, and wherein.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Figure 1:
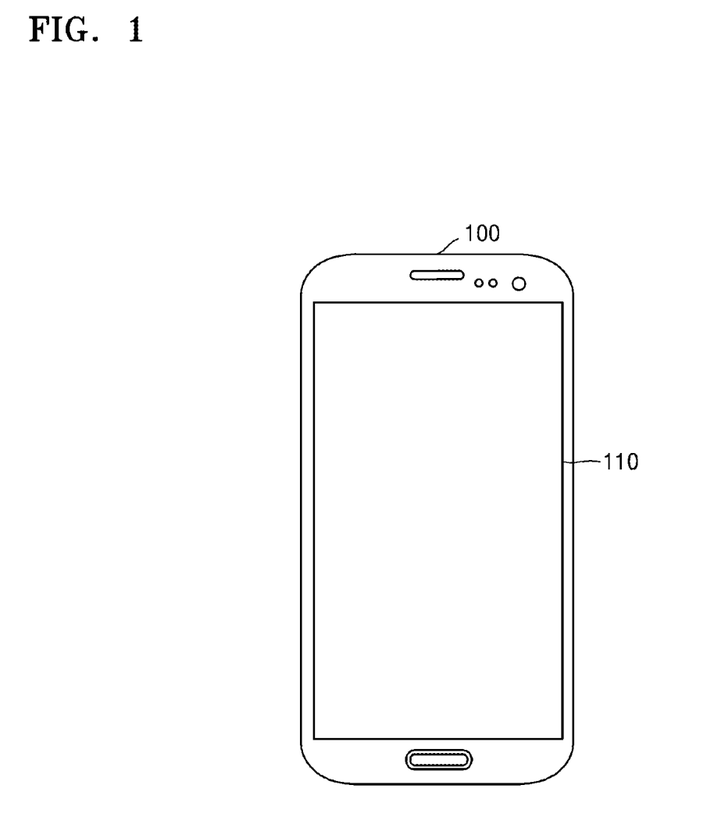
FIGS. 1 and 2 are diagrams of a user terminal that performs a display control method, according to at least one example embodiment.

FIG. 1 is a diagram of a user terminal 100 performing a display control method, according to at least one example embodiment.

The user terminal 100 may be a personal computer (PC), a portable terminal, and/or other computer processing device. In FIG. 1, the user terminal 100 is a portable device and is illustrated as a smart phone including a display unit 110 (e.g., a display panel, display screen, and/or display device, etc.), but the example embodiments are not limited thereto.

Figure 2:
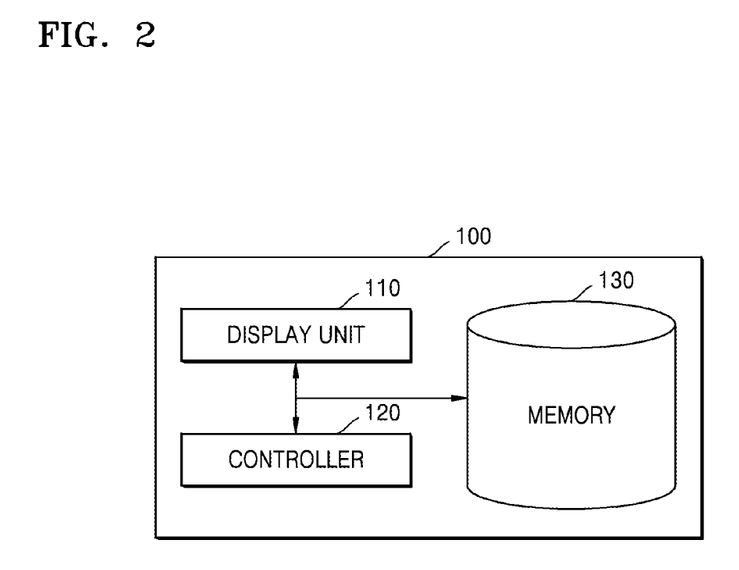

Referring to FIG. 2, the user terminal 100 according to at least one example embodiment may include the display unit 110, a controller 120, and a memory 130.

The display unit 110 according to at least one example embodiment may denote a display device that displays various images and/or text, such as a figure, a character, etc., based on an electric signal generated by the controller 120. For example, the display unit 110 may include one of a cathode ray tube (CRT), a liquid crystal display (LCD), a plasma display panel (PDP), and an organic light-emitting diode (OLED) display, etc., but the example embodiments are not limited thereto.

The display unit 110 may further include an input unit (e.g., an input device, an input/output (I/O) device, an I/O interface, etc.) via which an input of a user is received. For example, the display unit 110 may be a touch input type device (e.g., a touchscreen, etc.) that further includes a digitizer that reads the touch coordinates of the user (e.g., the coordinates corresponding to the location on the touchscreen that a user contacted) and converts the touch coordinates to an electric signal, so as to obtain an input of the user according to a screen displayed on the display unit 110. In other words, the display unit 110 may be a touch screen including a touch panel. Here, the touch panel may further read touch pressure, an electrical capacitance reading associated with the user's finger in proximity to the touch panel, or other sensor readings, in addition to touch coordinates of the user, and convert the touch pressure, sensor readings, and/or the touch coordinates to an electric signal.

Additionally, the input unit may be included in the user terminal 100 separately from the display unit 110. For example, the input unit may be one or more of a keyboard, a mouse, a track ball, a microphone, a button, a camera, a pressure sensor, etc., which is provided separately from the display unit 110.

Hereinafter, the display unit 110 is described to be a touch screen that includes an input unit capable of detecting a touch of the user and reading touch pressure, but the example embodiment are not limited thereto.

The controller 120 according to at least one example embodiment may include a processing apparatus capable of processing data, such as one or more processors. Here, the 'processor' may be, for example, a data processing apparatus that is embedded in hardware and includes a physically structured circuit to perform a function expressed in computer readable instructions, such as executable code, machine readable code, human readable code, a command included in a program, etc. Examples of such a data processing apparatus include a microprocessor, a central processing unit (CPU), a processor core, a multi-core processor, a multiprocessor, a distributed processing system, a cloud computing system, an application-specific integrated circuit (ASIC), a field programmable gate array (FPGA), etc., but are not limited thereto.

The memory 130 according to at least one example embodiment performs a function of temporarily or permanently storing data, an instruction (e.g., a computer readable instruction), a program, a program code, or a combination thereof processed by the user terminal 100. The memory 130 may include a magnetic storage medium and/or a flash storage medium, but the example embodiment are not limited thereto.

Although not illustrated, the user terminal 100 according to an example embodiment may include a communication unit. The communication unit may be an apparatus including hardware and software required to exchange signals, such as control signals or data signals, with a network apparatus over a wired and/or wireless network, but the example embodiments are not limited thereto.

The controller 120 according to at least one example embodiment may obtain a first input of the user regarding a first region displayed on the display unit 110.

According to at least one example embodiment, 'a region', such as 'a region displayed on a display unit' may be a distinguished region displaying content and/or a manipulation interface on the display unit.

Meanwhile, according to at least one example embodiment, 'an input regarding a region' may be an input regarding a location of a display unit where the region is displayed and/or recognized to be displayed.

As described above, since the display unit 110 may be a touch screen, the first input and a second input described later may be an input of the user touching the touch screen.

Such an input may be at least one of a simple touch input, an input having different pressures, an input moving in one direction at a desired and/or pre-set speed or higher, an input repeated within a desired and/or pre-set time period, an input continued for at least a desired and/or pre-set time period, multiple simultaneous inputs, inputs performing a desired and/or pre-set gesture or motion, a button press, etc.

According to at least one example embodiment, 'a first region' may be a target region including content to be edited by the user. For example, the first region may be a graphical user interface (GUI) element, such as a text box, an address window for inputting a web address, a text document, etc., and the user may perform a first input regarding the first region to start editing content included in the first region (e.g., the text box, address window, text document, etc.). Here, the editing may be performed by adding, changing, and/or deleting text. However, the example embodiments are not limited thereto, and the first region may be a region including a character, an image, a video, etc., in addition to text.

The controller 120 according to at least one example embodiment may activate an input reference object located in the first region based on the obtained first input.

According to at least one example embodiment, 'an input reference object' may be an object for displaying a part (e.g., location, GUI element, etc.) where an input and/or editing is currently being performed. As described above, according to some example embodiments, since the first region may be a target region including content to be edited, the input reference object may display a part (e.g., location, GUI element, etc.) of the content of the first region, which is being edited. For example, the input reference object may be a cursor, an icon, a highlighted subregion (e.g., highlighted text), etc., displayed on the display unit.

Meanwhile, according to at least one example embodiment, 'activating' of the input reference object may mean that a state of the input reference object is changed to a usable state. For example, the 'activating' of the input reference object may mean that the input reference object is displayed on the first region and is moved according to a manipulation operation (e.g., moving the input reference object, modifying the input reference object, adding another input reference object, etc.) of the user. However, the example embodiments are not limited thereto.

The controller 120 according to at least one example embodiment may display an interface (e.g., a user interface) for manipulating the input reference object, on a second region of the display unit 110, based on the first input.

As described above, 'a region', such as 'a region on a display unit' may be a distinguished region displaying content and a manipulation interface on the display unit 110. Also, the input reference object may be an object for displaying a part where an input and/or editing is currently being performed.

According to at least one example embodiment, 'an interface for manipulation of an input reference object' may be an interface (e.g., user interface) for manipulating (e.g., moving a location of the input reference object, modifying the input reference object, adding the input reference object, etc.) the input reference object in the first region. For example, the interface may include a slider for changing the location of the input reference object along one axis, and/or a knob moving on the slider and corresponding to the location of the input reference object in the first region, etc. In other words, the user may move the knob along the slider to move the location of the input reference object in the first region according to at least one example embodiment, but the example embodiments are not limited thereto.

Also, the interface may include a knob that is manipulatable (e.g., capable of being manipulated, interacted with, etc.) in all directions to change the location of the input reference object in a 2-dimensional (2D) space and/or 3-dimensional (3D) space. In this case, the user may manipulate the knob in a direction (e.g., left, right, in, out, etc.) for moving the location of the input reference object, thereby moving the location of the input reference object in the first region.

However, the two types of interfaces described above are only examples, and an interface is not limited thereto as long as a location of an object is moved according to a manipulation (e.g., manipulation operation, manipulation instructions, etc.) of a user.

While displaying the interface, the controller 120 according to at least one example embodiment may set one or more points in the second region as a reference point or reference points. Here, the reference point may be a point corresponding to a current location of the input reference object in the first region, but is not limited thereto.

The controller 120 may set, in the second region, the reference point corresponding to the current location of the input reference object in the first region such that a location of the input reference object in the first region is shown in the second region and the user is able to change the location of the input reference object in the first region by referring to the reference point. Additionally, the controller 120 may set, in the second region, a desired location in the first region as the reference point. The desired location may be set according to a user input according to at least one example embodiment.

Meanwhile, the controller 120 may activate the input reference object and display the interface for manipulation simultaneously and/or sequentially. Accordingly, the controller 120 may activate the input reference object and at the same time, display the interface, and/or may activate the input reference object and then display the interface.

The controller 120 according to at least one example embodiment may obtain a second input of the user regarding the interface displayed in the second region.

As described above, 'an input regarding a region' may be an input regarding or associated with a location of a display unit where the region is displayed and/or recognized to be displayed. Accordingly, obtaining an input regarding the interface displayed in the second region may also mean obtaining an input regarding a location of the display unit 110 where the interface is displayed and/or recognized to be displayed. Here, an input such as 'the second input' is similar to the first input described above, and details in common between the two are not provided again.

The second input may vary depending on the interface type. For example, when the interface includes the slider for changing the location of the input reference object along one axis, and the knob moving on the slider that indicates the location of the input reference object, the second input may be a continuous input regarding the knob on the slider. Here, 'a continuous input' may denote one or more inputs connected via a dragging operation, and the dragging operation may be an input moving from an initial location to another location without releasing the input. Accordingly, the controller 120 may obtain, as the second input, an input regarding the knob and continuing via drag.

Meanwhile, when the interface includes the knob manipulatable in all directions to change the location of the input reference object in the 2D space and/or 3D space, the second input may be a drag and/or a touch or other input pulling or pushing the knob in one direction. Here, in addition, the second input may be a continuous input.

However, the second input is not limited thereto, and may vary depending on the interface type.

The controller 120 according to at least one example embodiment may change the location of the input reference object in the first region based on the obtained second input.

For example, the controller 120 may change the location of the input reference object in the first region to a to-be-changed location such that a relative location relationship between the reference point and an input point corresponding to the second input corresponds to a relative location relationship between the current location of the input reference object and the to-be-changed location of the input reference object. Here, as described above, the reference point may be the point corresponding to the current location of the input reference object in the first region according to some example embodiments.

For example, when the interface includes the slider for changing the location of the input reference object along one axis and the knob moving on the slider that indicates the location of the input reference object, the reference point is at the center of the slider. In this case, when the user drags the knob to the left on the slider based on the reference point, the relative location relationship between the reference point and the input point corresponding to the second input may be a point at the center (e.g., the reference point) and a point relatively to the left of the center (e.g., the point corresponding to the second input). The controller 120 may determine the to-be-changed location (e.g., a future location) of the input reference object such that a relationship (e.g., spatial relationship) between the current location of the input reference object and the to-be-changed location (e.g., the future location) corresponds to the above relationship by referring to such a relative location relationship. In other words, the controller 120 may determine the to-be-changed location (e.g., the future location) of the input reference object such that the to-be-changed location is relatively at the left, compared to the current location of the input reference object.

Additionally, the controller 120 may determine a distance (e.g., a second distance) between the current location of the input reference object and the to-be-changed location of the input reference object by referring to a distance (e.g., a first distance) between the reference point and the input point corresponding to the second input. For example, the controller 120 may determine the first distance and the second distance to be the same, determine the second distance to be two times, three times, or five times, etc., the first distance, or determine the second distance to be one-half, one-third, one-fourth, etc., the first distance. In other words, the first distance and the second distance may be the same, a factor and/or a fraction of each other. Such a magnification or reduction may be determined by the user according to a size of the display unit 110, the sensitivity of an input unit (not shown), or the like.

Meanwhile, for example, when the interface includes the knob manipulatable in all directions to change the location of the input reference object in the 2D space and/or 3D space, the reference point is at the center of the interface. When the user drags the knob to the top left of the interface based on the reference point, the relative location relationship between the reference point and the input point corresponding to the second input may be a point at the center (e.g., the reference point) and a point relatively located at the top left of the center (e.g., the input point corresponding to the second input). By referring to such a relative location relationship, the controller 120 may determine the to-be-changed location (e.g., future location) of the input reference object such that the to-be-changed location of the input reference object is relatively located at the top left, compared to the current location of the input reference object. In addition at this time, the controller 120 may determine the second distance based on the first distance and a set magnification and/or reduction (hereinafter referred to as "magnification").

Meanwhile, when the second input includes one or more continuous inputs, the controller 120 may continuously change the location of the input reference object in the first region based on the second input. In addition, when the second input has ended, the controller 120 may update a point in the first region, which corresponds to the reference point in the second region, to a point corresponding to the current location of the input reference object in the first region according to at least one example embodiment, but is not limited thereto.

For example, when the interface includes the slider for changing the location of the input reference object along one axis and the knob moving on the slider and indicating the location of the input reference object, and the second input is an input of dragging the knob to the left, the location of the input reference object in the first region may move to the left. Accordingly, when the second input, i.e., the input of dragging the knob to the left, has ended, the controller 120 may display the knob at the center of the slider again, and update a point in the first region, which corresponds to the location of the knob, to a point corresponding to the current location of the input reference object in the first region. In other words, when the second input has ended, the controller 120 may update the point in the first region, which corresponds to the reference point in the second region, to the point corresponding to the current location of the input reference object in the first region, but is not limited thereto.

The controller 120 according to at least one example embodiment may display the input reference object in the first region according to the changed location.

As such, the user may accurately and quickly move the input reference object in the first region. For example, when the user terminal 100 includes the touch panel as an input unit, since a region to which an input is being performed is inevitably covered by a finger of the user, an accurate input is difficult to perform. In detail, it is difficult to accurately locate the input reference object at a point where the user wants to correct a typographical error, add a word in the middle of a sentence, interact with a game, edit an image, etc., while entering inputs using the touch panel as a input unit or other input units that may require the display to be obscured while performing an input operation (e.g., a display that receives inputs using a stylus, a virtual reality (VR) display, an augmented reality (AR) display, etc.).

According to at least one example embodiment, by distinguishing a region where the input reference object is displayed from a region where the interface for changing the location of the input reference object is displayed, the input reference object may be accurately located at a desired location via simple manipulation of a virtual interface control (e.g., the slider, the knob, etc.). As such, according to some example embodiments, manipulability of the user terminal 100 may be increased.

Figure 3:
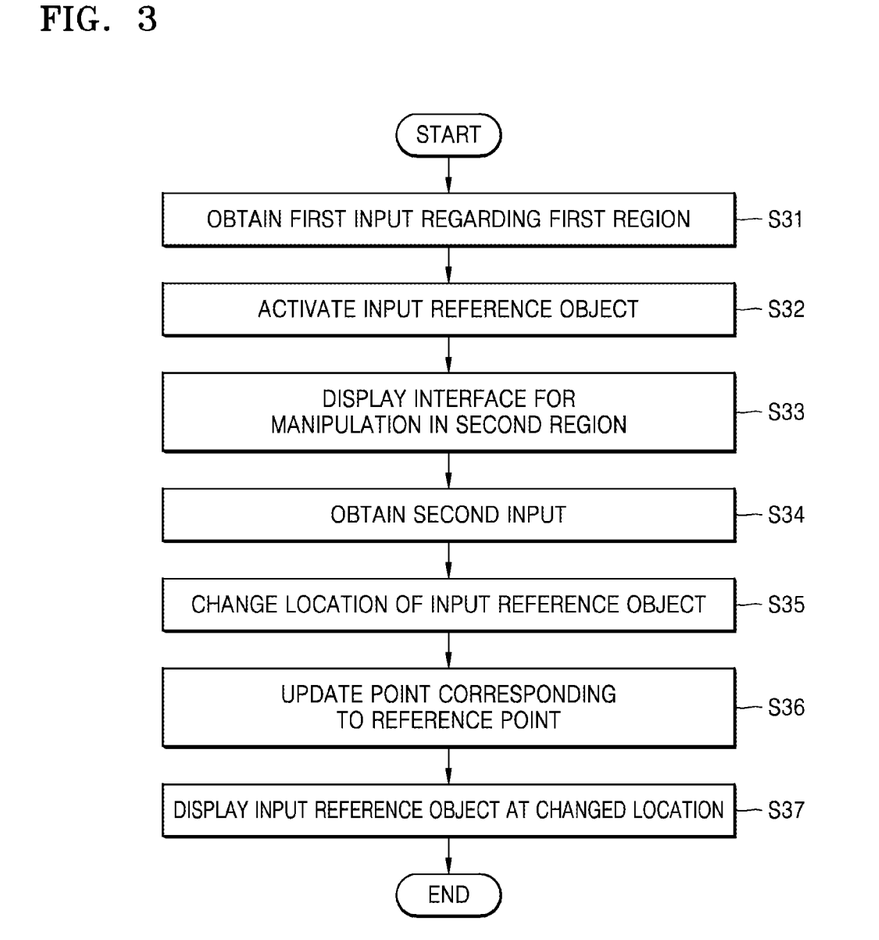
FIG. 3 is a flowchart of a display control method performed by a user terminal according to at least one example embodiment.

FIG. 3 is a flowchart of a display control method performed by the user terminal 100 according to at least one example embodiment. Hereinafter, repeated descriptions provided above with reference to FIGS. 1 and 2 are omitted.

First, referring to FIG. 3, the controller 120 according to at least one example embodiment may obtain the first input of the user regarding the first region displayed on the display unit 110, in operation S31.

'A first region' according to at least one example embodiment may be a target region including content to be edited by a user. For example, the first region may be a text box and the user may edit content in the text box by performing a first input regarding the first region. Here, the editing may be adding, changing, or deleting text. However, the example embodiments are not limited thereto, and a region including a character, an image, a video, etc., as well as text may be the first region.

The controller 120 according to at least one example embodiment may activate the input reference object in the first region based on the obtained first input, in operation S32.

'An input reference object' according to at least one example embodiment may be an object for displaying a part where an input and/or editing that is currently being performed. As described above, since a first region according to at least one example embodiment may be a target region including content to be edited by a user, the input reference object may display which part of the content in the first region is being edited. For example, the input reference object may be a cursor used on a computer, but is not limited thereto.

'Activation' of an input reference object according to at least one example embodiment may denote that a state of the input reference object is changed to a usable state. For example, the 'activation' of the input reference object may mean that the input reference object is displayed in the first region and is movable according to a manipulation operation of the user. However, the example embodiments are not limited thereto.

The controller 120 according to at least one example embodiment may display the interface for manipulating the input reference object, in the second region of the display unit 110, based on the first input, in operation S33.

According to at least one example embodiment, the input reference object may be an object for displaying a part where an input and/or edit operation is currently being performed.

'An interface for manipulating an input reference object' according to at least one example embodiment may be a user interface for moving a location of the input reference object in a first region. For example, the interface may include a slider for changing the location of the input reference object along one axis and a knob moving on the slider and indicating the location of the input reference object, a button configured to change the location of the input reference object to a desired location, a 3D scale for manipulating the location of the input reference object in a 3D space, a virtual map (e.g., a mini map, mini display, etc.) for indicating the location of the input reference object through a representation of the 2D space or 3D space, a combination user interface control interface (e.g., a combination of at least two user interface controls), etc. Also, the interface may include a knob manipulatable in all directions to change the location of the input reference object in a 2D space and/or a 3D space, etc. The above user interfaces are only examples, and the interface is not limited thereto as long as a location of an object is movable according to manipulation of a user.

Meanwhile, while displaying the interface, the controller 120 may set any one point (or more than one point) in the second region as the reference point (or reference points). Here, the reference point may be a point corresponding to the current location of the input reference object in the first region, but is not limited thereto. For example, there may be a plurality of reference points assigned that correspond to a path and/or trail that the input reference object follows and/or is to follow, etc.

The controller 120 may set, in the second region, the reference point corresponding to the current location of the input reference object in the first region such that the location of the input reference object in the first region is indicated in the second region. Additionally, the user may change, in the second region, the location of the input reference object in the first region by referring to the reference point, but the example embodiments are not limited thereto.

Meanwhile, operations S32 and S33 are shown in a time-series for description purposes, but may be performed simultaneously or sequentially.

The controller 120 according to at least one example embodiment may obtain the second input of the user regarding the interface displayed in the second region, in operation S34.

The second input may vary depending on the interface type. For example, when the interface includes the slider for changing the location of the input reference object along one axis, and the knob moving on the slider for indicating the location of the input reference object, the controller 120 may obtain a continuous input regarding the knob on the slider. The 'continuous input' may indicate that one or more inputs are connected via a dragging operation, and the dragging operation may be an input moving from an initial location to another location without releasing the input, but the continuous input is not limited thereto. In other words, the controller 120 may obtain an input regarding the knob and continuing via a drag.

Also, when the interface includes the knob manipulatable in all directions to change the location of the input reference object in a 2D space and/or 3D space, the controller 120 may obtain a drag and/or a touch or other input pulling or pushing the knob in one direction.

The second input is not limited thereto, and may vary depending on the interface type.

The controller 120 according to at least one example embodiment may change the location of the input reference object in the first region based on the obtained second input, in operation S35.

For example, the controller 120 may change the location of the input reference object in the first region to the to-be-changed location (e.g., future location) such that the relative location relationship between the reference point and the input point corresponding to the second input corresponds to the relative location relationship (e.g., relative spatial location) between the current location of the input reference object and the to-be-changed location of the input reference object. As described above, the reference point may be a point corresponding to the current location of the input reference object in the first region according to at least one example embodiment, but is not limited thereto.

For example, when the interface includes the slider for changing the location of the input reference object along one axis and the knob moving on the slider and indicating the location of the input reference object, the reference point is at the center of the slider. Accordingly, when the user drags the knob to the left on the slider based on the reference point, the relative location relationship (e.g., relative spatial relationship) between the reference point and the input point corresponding to the second input may be a point at the center (e.g., reference point) and a point relatively left to the center (e.g., point corresponding to the second input). By referring to such a relative location relationship, the controller 120 may determine the to-be-changed location of the input reference object such that a relationship between the current location and the to-be-changed location of the input reference object corresponds to the above relationship. In other words, the controller 120 may determine the future location of the input reference object such that the future location is located relatively to the left, compared to the current location of the input reference object.

Additionally, the controller 120 may determine the distance (e.g., the second distance) between the current location and the to-be-changed location of the input reference object by referring to the distance (e.g., the first distance) between the reference point and the input point corresponding to the second input. For example, the controller 120 may determine the first and second distances to be the same, determine the second distance to be two, three, or five times, etc., of the first distance, or determine the second distance to be one-half, one-third, one-fourth, etc., the first distance. In other words, the first distance and the second distance may be the same, a factor and/or a fraction of each other. Such a magnification and/or reduction may be determined by the user according to a size of the display unit 110, the display resolution of the display unit 110, the sensitivity of an input unit, or the like.

Meanwhile, it is assumed that the interface includes the knob manipulatable in all directions to change the location of the input reference object in a 2D space and/or 3D space, and the reference point is at the center of the interface. Therefore, when the user drags the knob to the left top of the interface based on the reference point, the relative location relationship between the reference point and the input point corresponding to the second input may be a point at the center (e.g., the reference point) and a point relatively at the top left of the screen, compared to the center (e.g., the point corresponding to the second input). By referring to the relative location relationship, the controller 120 may determine the to-be-changed location of the input reference object such that the to-be-changed location is located relatively at the top left, compared to the current location of the input reference object. Here, the controller 120 may determine the second distance based on the first distance and a set magnification (and/or reduction).

Meanwhile, when the second input includes one or more continuous inputs, the controller 120 may change the location of the input reference object in the first region based on the one or more continuous inputs.

In addition, when the second input has ended, the controller 120 may update a point in the first region, which corresponds to the reference point in the second region, to a point corresponding to the current location of the input reference object in the first region, in operation S36. For example, when the second input that is an input of dragging the knob to the left has ended, the controller 120 may display the knob at the center of the slider again and at the same time, update a point in the first region, which corresponds to the location of the knob, to a point corresponding to the current location of the input reference object in the first region.

The controller 120 according to at least one example embodiment may display the input reference object according to the changed location (e.g., updated location) in the first region, in operation S37.

Figure 4:
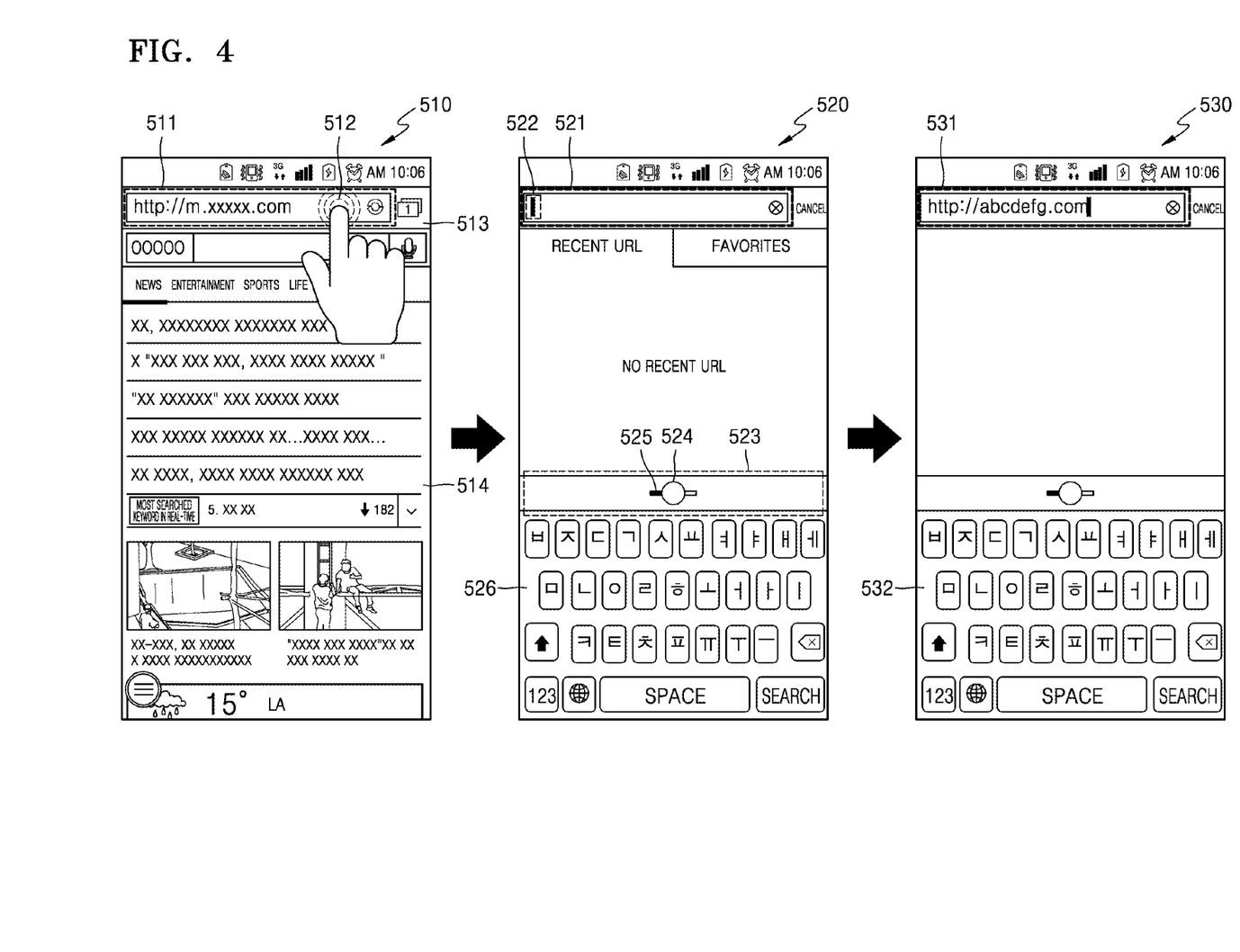
FIG. 4 illustrates screens of performing a first input on a display unit of a user terminal, according to at least one example embodiment.
Figure 5:
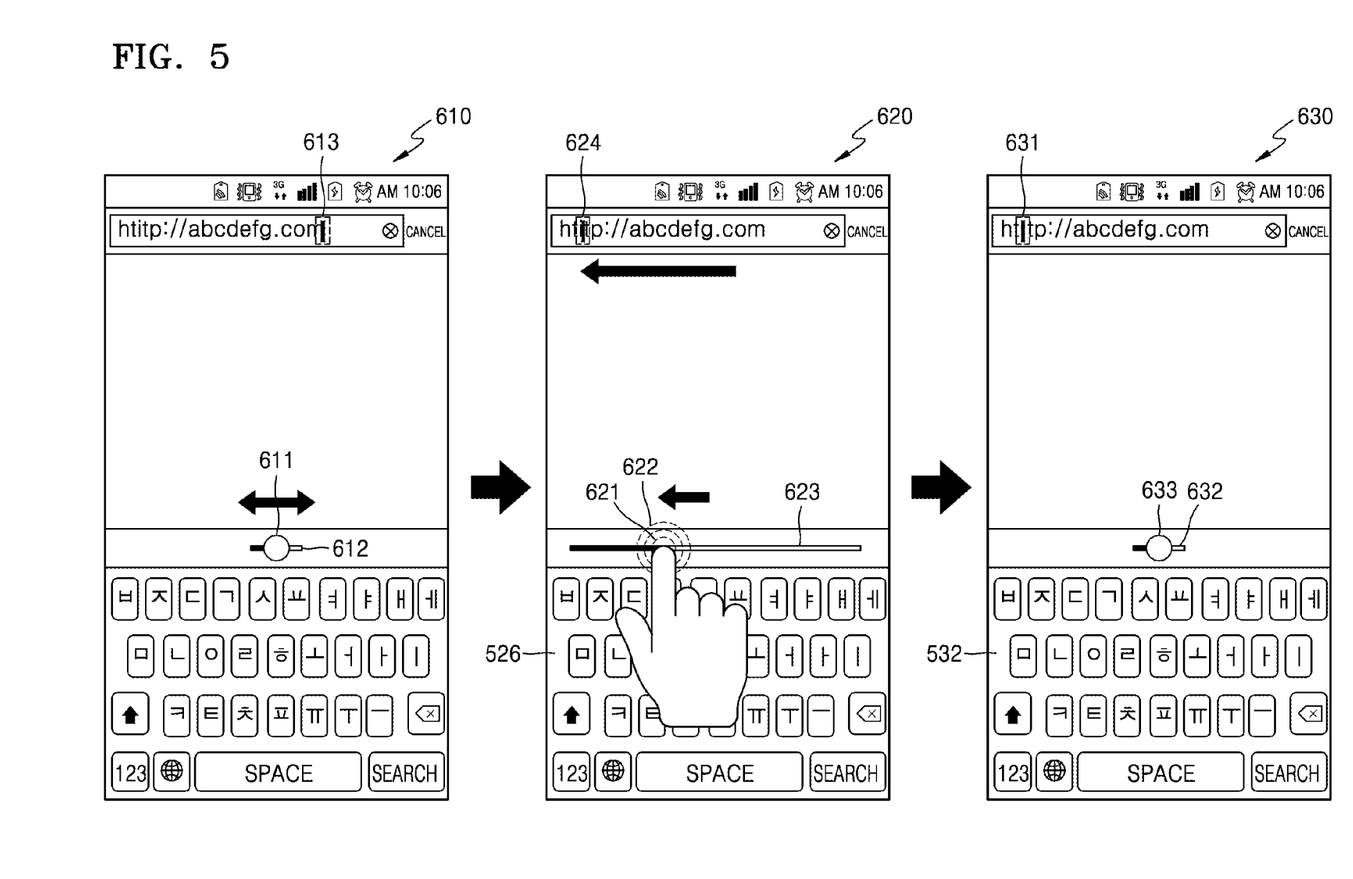
FIG. 5 illustrates screens of changing a location of an input reference object through an interface according to at least one example embodiment.
Figure 6:
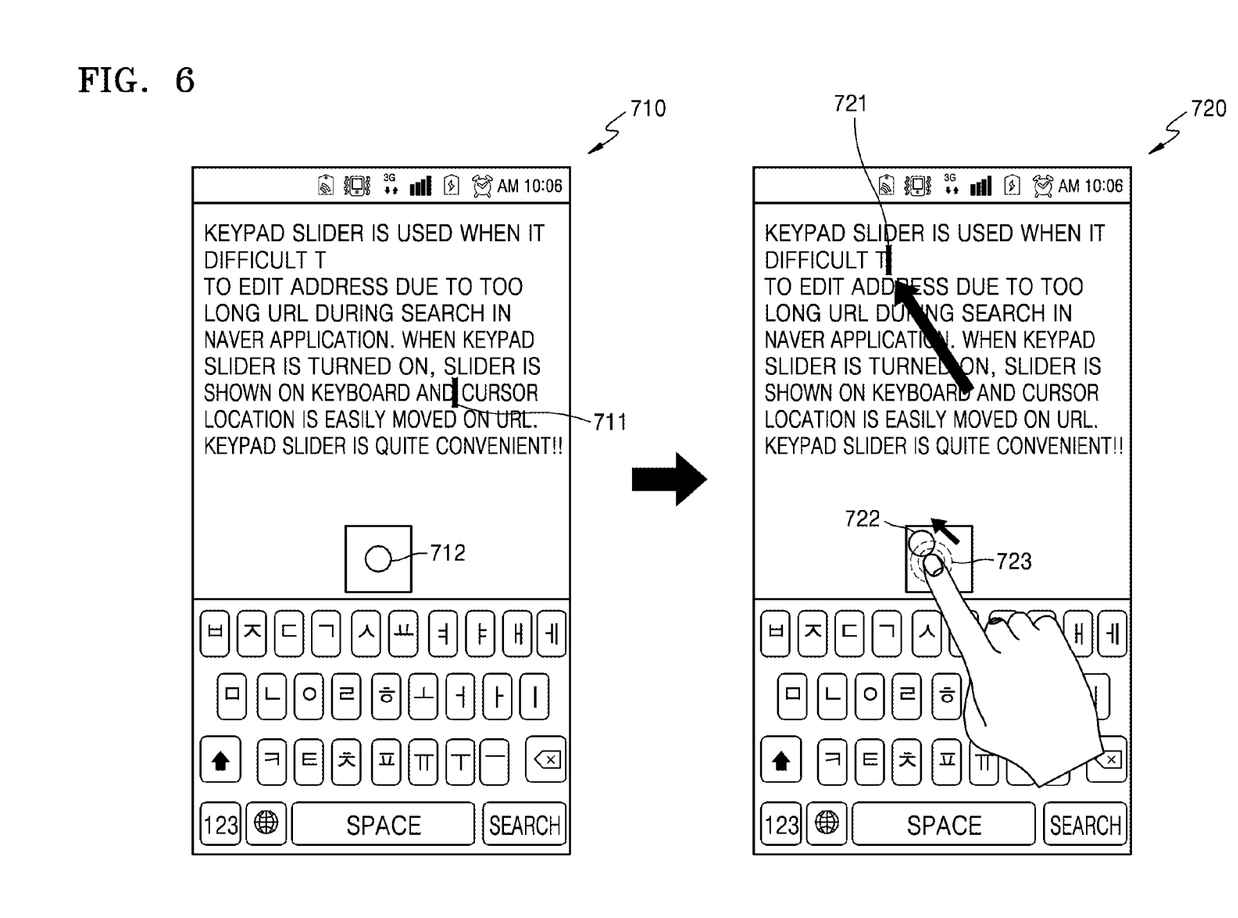
FIG. 6 illustrates screens of changing a location of an input reference object through a 2-dimensional (2D) interface according to at least one example embodiment.

FIGS. 4 through 6 illustrate screens displayed on the display unit 110 of the user terminal, according to some example embodiments.

FIG. 4 illustrates screens 510 through 530 of performing a first input on the display unit 110 of the user terminal 100, according to at least one example embodiment, but the example embodiments are not limited thereto.

First, referring to the screen 510, the screen 510 may include a header region 513 (e.g., header user interface region) which includes subsidiary user interface menus and a first region 511 for inputting a web address. The screen 510 may also include a web page display region 514 that displays a web page.

When the controller 120 obtains (e.g., receives) a touch input 512 via the input unit that is the first input regarding the first region 511 of the screen 510, the controller 120 may activate an input reference object 522 in a first region 521 and display an interface for manipulating the input reference object 522 in a second region 523, as shown on screen 520. Here, the controller 120 may further display a keypad 526 (e.g., a virtual keyboard) and/or other virtual input entry unit/device (e.g., a virtual mouse, a virtual map, a voice command program, a text-to-speech program, a speech-to-text program, an image capture program configured to translate physical movement into user input for computing environments, etc.) for performing an input regarding the first region 521. Here, the interface may include a slider 525 for changing a location of the input reference object 522. Additionally, a knob 524 may be displayed on the slider 525 at a point on the slider 525 that corresponds to a desired reference point or at an input point on the slider 525 corresponding to a second input along the slider 525, but is not limited thereto. For example, the knob 524 may be located at the center of the slider 525 if the center of the slider corresponds to the reference point, or may be manipulated by a user input to be located at a different point on the slider 525 (e.g., the left or right side of the slider) based on a second input.

Meanwhile, as shown in the screen 530, the user may input a web address to a first region 531 according to an activated input reference object by using a keypad 532, but is not limited thereto. For example, other types of virtual input entry units may be provided by various example embodiments, such as a virtual user input displaying drawing tools/functions, image manipulation tools/functions, video manipulation tools/functions, text manipulation tools/functions, game controls/functions, speech-to-text applications, text-to-speech applications, etc.

FIG. 5 illustrates screens 610 through 630 of changing a location of an input reference object through an interface according to at least one example embodiment.

First, referring to the screen 610, an input reference object 613 is generally at the last character of a web address when the web address has been input. Here, according to a general method, when a typographical error, for example, "htitp" is corrected to "http", the user needs to accurately touch the point where the character 'i' is located in the text string "htitp".

However, according to at least one example embodiment, the user may change the location of the input reference object 613 by manipulating a knob 611 on a slider 612 to the left and right. For example, referring to the screen 620, the user may perform a drag input 622 moving a knob 621 to the left along a slider 623, thereby accurately moving the input reference object 624 to any desired location within the first region, such as the location of a typographical error, etc. Additionally, the length of the slider 612 may increase according to the drag input 622 according to some example embodiments (see, for example, the length of the slider 623).

Meanwhile, when the drag input 622 that corresponds to the second input has ended, the input reference object 631 may be located at the point where the last correction is performed, and the knob 633 and the slider 632 may be restored to original states (e.g., default positions) as illustrated on the screen 630 of FIG. 5. In other words, the knob 633 may be located at the center of the slider 632 again and a length of the slider 632 may be reduced again back to its original size, but the example embodiments are not limited thereto. Additionally, the controller 120 may update a reference point, i.e., the center location where the knob 633 is located, to a point corresponding to the current location of the input reference object 631.

Then, the user may change the location of the input reference object 631 again by moving the knob 633 to any point on the slider 632.

FIG. 6 illustrates screens 710 and 720 of changing a location of an input reference object through a 2D interface according to at least one example embodiment.

First, referring to the screen 710, a typographical error is found in the block of text that includes the phrase "difficult t to". According to a general method, the user has to accurately touch a point on the touchscreen where 't' is located in order to correct that typographical error.

However, according to at least one example embodiment, the user may change the location of the input reference object 711 by manipulating the knob 712, not only to left and right, but also to the top and bottom, and/or in and out (e.g., for example, by increasing/decreasing the pressure applied to the knob 712, performing repetitive actions on the knob 712, performing a clicking action on the knob 712 for a desired period of time, etc.).

In detail, referring to the screen 720, the user may perform an input 723 of dragging a knob 722 to the top left of the 2D interface (e.g., a box, etc.) that represents the user interface element corresponding to the first region that includes the block of text, thereby accurately moving the input reference object 721 to the point where the typographical error 't' is located.

According to one or more example embodiments, by distinguishing a region where an input reference object is displayed and a region where an interface for changing a location of the input reference object is displayed, the input reference object may be accurately located at a desired point via the simple manipulation of one or more user interface elements.

Also, according to one or more example embodiments, the movement accuracy of the input reference object may be increased, and the input reference object may be easily and intuitively moved.

In addition, according to one or more example embodiments, the manipulability and/or usability of a user terminal may be increased.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A display control method comprising:
obtaining, using at least one processor, a first user input associated with a first region displayed on a display device;
activating, using the at least one processor, an input reference object in the first region based on the first user input;
displaying, using the at least one processor, an interface for manipulating the input reference object in a second region displayed on the display device based on the first user input, the interface including,
a slider extending along an axis corresponding to one axis of the first region and configured to change a location of the input reference object based on a received user input, and
a knob displayed on the slider and corresponding to a reference point or an input point, the input point corresponding to a second user input;
obtaining, using the at least one processor, the second user input regarding the knob, wherein the second user input comprises one or more continuous user inputs to the knob; and
changing, using the at least one processor, the location of the input reference object in the first region based on the second user input, and wherein
the displaying of the interface comprises setting a point on the slider as the reference point,
the reference point corresponding to a current location of the input reference object in the first region, and
after the second user input is ended, moving the knob to a default position of the reference point on the slider, and updating the reference point to a point corresponding to the current location of the input reference object in the first region.

2. The display control method of claim 1, wherein
the changing of the location of the input reference object comprises changing the location of the input reference object in the first region to a to-be-changed location of the input reference object; and
the reference point and an input point corresponding to the second user input corresponds to a relative location relationship between the current location of the input reference object and the to-be-changed location of the input reference object.

3. The display control method of claim 1, wherein
the location of the input reference object in the first region changes along one axis.

4. The display control method of claim 1, wherein
the location of the input reference object in the first region is changed with regards to a 2-dimensional (2D) space; and
the interface comprises,
a 2D plane associated with the 2D space configured to receive at least one user input related to changing the location of the input reference object; and
the knob is displayed on the 2D plane.

5. The display control method of claim 1, further comprising:
displaying, using the at least one processor, the input reference object based on the changed location in the first region.

6. The display control method of claim 1, wherein
the first region is a text box where text is input; and the first user input is at least one of a tap input, a click input, and a touch input associated with at least a part of the text box.

7. A display control apparatus comprising:
a memory having computer readable instructions stored thereon; and
at least one processor configured to execute the computer readable instructions to,
generate a screen comprising one or more regions for display on a display device;
obtain at least a first user input and a second user input related to one or more objects displayed on the display device; and
based on the obtained first user input regarding a first region displayed on the display device,
   activate an input reference object in the first region,
   display, in a second region displayed on the display device, an interface for manipulating the input reference object, the interface including,
      a slider extending along an axis corresponding to one axis of the first region, and the slider configured to change a location of the input reference object based on a received user input, and
      a knob displayed on the slider and corresponding to a reference point or an input point, the input point corresponding to the second user input,
   set at least one point on the slider as the reference point, wherein the reference point corresponds to a current location of the input reference object in the first region, and
   change the location of the input reference object in the first region based on the second user input, wherein the second user input comprises one or more continuous user inputs to the knob, and
   after the second user input is ended, move the knob to a default position of the reference point on the slider, and update the reference point to a point corresponding to the current location of the input reference object in the first region.

8. The display control apparatus of claim 7, wherein the at least one processor is further configured to:
change the location of the input reference object in the first region to a to-be-changed location of the input reference object; and
the reference point and an input point corresponding to the second user input corresponds to a relative location relationship between the current location of the input reference object and the to-be-changed location of the input reference object.

9. The display control apparatus of claim 7, wherein the at least one processor is further configured to:
change the location of the input reference object in the first region along one axis.

10. The display control apparatus of claim 7, wherein the at least one processor is further configured to:
change the location of the input reference object in the first region on a 2-dimensional (2D) space; and
the interface comprises,
a 2D plane associated with the 2D space and configured to receive at least one user input to change the location of the input reference object; and
the knob is displayed on the 2D plane.

11. The display control apparatus of claim 7, wherein the at least one processor is further configured to display the input reference object according to the changed location in the first region.

12. A non-transitory computer-readable recording medium having computer readable instructions stored thereon, which when executed by at least one processor, causes the at least one processor to execute the display control method of claim 1.

* * * * *